United States Patent Office 3,714,068
Patented Jan. 30, 1973

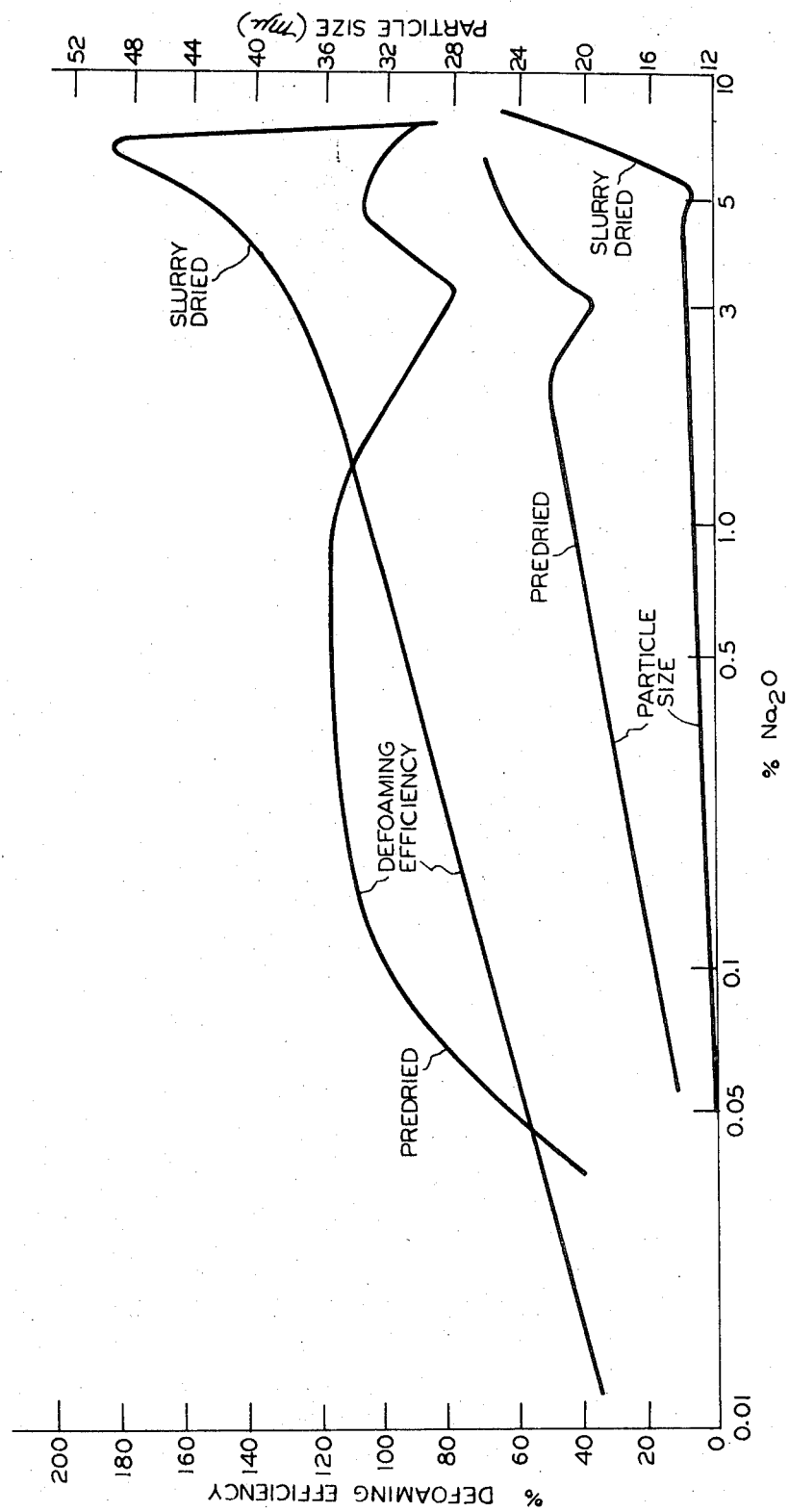

3,714,068
SILICA
James R. Miller and Richard H. Pierce, Broomall, Robert W. Linton, Springfield, and John H. Wills, Thornbury Township, Pa., assignors to Philadelphia Quartz Company, Philadelphia, Pa.
Continuation-in-part of applications Ser. No. 574,899, Aug. 25, 1966, Ser. No. 817,865, Apr. 21, 1969, and Ser. No. 854,783, Sept. 2, 1969, all now abandoned. This application Dec. 28, 1970, Ser. No. 101,640
Int. Cl. B01d 17/00
U.S. Cl. 252—358                                     3 Claims

ABSTRACT OF THE DISCLOSURE

Improved micro fine silicas are prepared with modified surface layers. The surface may be modified by controlling the pH of the silica slurry between about 1.5 and 12 and permanently affixing from 6 to 20% of a siloxane or silane based on the weight of the silica. The surface may be further controlled by varying the composition of the water layer on the surface of the silica and by controlling the choice and curing of the silicone and/or silica. An especially improved defoamer for aqueous systems is thus formed by compounding 3 to 30% of the improved hydrophobic silica having between about 2.5 and 8% of $Na_2O$ and an area below about 175 $m^2/g$. with an organic hydrocarbon liquid, said composition having a viscosity of from about 10 to 3000 cps.

This is a continuation-in-part of U.S. application Ser. No. 574,899 filed Aug. 25, 1966, now abandoned, and U.S. application 817,865, filed Apr. 21, 1969; and U.S. application 854,783 filed Sept. 2, 1969.

BACKGROUND

This invention relates to micro fine precipitated silica improved for use in preventing or abating foams in aqueous systems susceptible thereto. It relates further to hydrophobic and alkaline hydrophilic precipitated micro fine silicas and the processes for the preparation thereof. Further, it relates to compositions more efficient than previous compositions in defoaming such aqueous systems, particularly black liquors formed in alkaline and acid pulping processes and the method of preparing said compositions. The highly alkaline hydrophilic silica is particularly adapted as a base silica made hydrophobic by treatment with organic reagents.

The state of the art of defoaming black liquor prior to our invention is well described in U.S. Pats. 3,388,073 (Domba), 3,207,698 (Liebling) and 3,076,768 (Boylan), and German Patent 1,074,559. After the chemical processing of wood fibers in the manufacture of paper, the fiber or pulp is washed in brown stock washes until free of a large amount of residual chemicals. The solution is referred to as "black liquor" which contains 14 to 18% of dissolved solids and has a pH of about 12. The black liquor foams readily and the amount of foaming varies with the resin content of the wood and other properties of the black liquor. There usually are three or four brown stock washes in series, and from them the pulp travels to the screening room where it is again diluted with water and put through a vibrating screen. Foam problems are especially severe in the screen room because of the effect of the violent agitation on the residual black liquor. Therefore it is obvious that defoamers are very important in the paper-making operation and it is desirable that the defoamers used in the system will carry through to the dilution water. Thus it is important to have available economical defoaming agents wherever such foaming is encountered in the paper-making process. The more effective the defoamer, the less needs to be added to the system and the less the cost. The defoamers are often a combination of a liquid hydrocarbon and a hydrophobic silica.

THE INVENTION

The base silica for the hydrated micro fine silica is best formed by separation from a slurry having a pH between about 1.5 and 12. At a pH above about 12, there is a great tendency for the silica to agglomerate strongly in situ and, if left in the slurry above about pH 12, the silica tends to dissolve. There does not seem to be any advantage in reducing the pH below about 1.5 or 2.

A micro fine precipitated silica has silanol and silanolate groups (—SiOH and —SiONa) covering all free Si bonds at the surface. Normally these groups are further covered by layers of water hydrogen-bonded thereto and finally there is a layer of physically adsorbed water. Also, the aggregation and/or bonding between particles is controlled by the interaction of the silica surfaces and surface layers of silanols, silanolates and water. A description of these surfaces by K. R. Lange in J. Colloid Science 20, 231–240 (1965) is considered part of this disclosure.

We have found that the conditioning of the silica surface is very important in its effective application. The conditioning includes controlling the proportion of hydrogen bonded and physically adsorbed water molecules on the surface of the silica as well as coating, including partially replacing said water molecules with polyvalent anions and hydrophobing agents. We find anions of a valence above two are preferable and we prefer silicone oils, silanes, and alcohol esters as hydrophobing agents.

Therefore we have found that unusually effective hydrophobic silica may be prepared by conditioning a hydrated micro fine silica base separated from a slurry having a pH of from about 2 to 12 so that the hydrogen bonded and physically adsorbed water is controlled and coating with a hydrophobing agent.

The method of treatment and preparation of the hydrophobic silica is quite important. If not properly prepared when used in defoaming, for example, it is necessary to include additives in the composition which increase the cost. We have now found that if the silica is a micro fine precipitated silica having an ultimate particle size below about 50 m$\mu$ and having 2.5 to 8% $Na_2O$, an area below 175 $m^2/g$. and preferably 50 to 175 $m^2/g$., and preferably having a conductivity in a 5% aqueous dispersion above about 1500 micromhos and a defoaming efficiency, based on the standard test set up below, of above about 100%, the organic silicone coating applied to form a hydrophobic silica may be permanently affixed with less difficulty and therefore more economically, and the resulting hydrophobic silica is more efficacious in a defoaming composition formed therewith when compared with hydrophobic silica from other base silicas. We have found that the heating for permanently affixing the silicone coating may be reduced considerably, in fact the amount of heat treatment depends not only on the silicone or silane used but also on the $Na_2O$ content of the silica and the possible presence of a catalyst other than the alkali which is itself an efficient catalyst for the reaction of many silicones. Thus the coating may be permanently affixed even at room temeprature under proper conditions. While the product may be made water-repellent by mere coating with the siloxane, an extended curing period is usually necessary to develop satisfactory water resistance. For heating, we have found a belt-type radiant furnace may be satisfactory or we may place covered containers in an oven. With siloxane coatings we have found it may be preferable to remove the bound water after blending, rather than before.

THE INVENTION MORE PARTICULARLY

Thus we have found a hydrophobic silica useful in defoaming agents comprising a hydrated finely divided, precipitated silica base from an aqueous suspension of undried silica having a pH greater than 10.0, said precipitated silica base having $Na_2O$ between 2.5 and 8%, particle size from about 14 to 50 millimicrons ($m\mu$), a surface area below about 175 m.²/g. and being 100% water resistant because of a permanently affixed, cured silicone oil coating on the surface thereof. This coating may be a polymethyl siloxane or a silane of the type well known and described in the prior art already mentioned. This hydrophobic silica may be used in a defoaming composition comprising hydrophobic organic liquid such as a mineral seal oil with about 5 to 30% of the finely divided hydrophobic silica of our invention. Our improvement also includes the prevention of foaming in aqueous solutions by the addition of the defoaming composition just described, and it also includes the method of forming a hydrophobic silica in which finely divided hydrated silica, from a suspension of undried silica having a pH greater than 10, having an ultimate particle size of from about 15 to 50 $m\mu$, a surface area of less than about 175 m.²/g. and greater than about 50 m.²/g. and a $Na_2O$ content between about 2.5 and 8%, and an ignited loss of less than about 15%, is coated with from 7 to 20% of a polymethyl siloxane or its equivalent, e.g. a silane, and said coating is thereafter cured in situ under the conditions found necessary for said coating with, or without a catalyst. We have found that in order for the hydrophobic silica from a precipitated hydrated silica to be an efficient defoaming agent it must not only resist hydrolysis but must provide a viscosity of less than about 500 centipoises (cp.) when 10% of the coated silica is dispersed in a mineral seal oil having a gravity of 26.7 API or a specific gravity at 60° F. of 0.894 and a viscosity at 70° F. of 137.5 Saybolt Universal Seconds (SUS), neutralization value determined as total acid number of 0.01 by ASTM test No. D-974 and an aniline point of 165° F. Ten percent of the coated silica is stirred in this oil for 2 minutes with a mechanical stirrer and the viscosity is determined with a Brookfield Viscometer using a No. 2 spindle rotating at 10 r.p.m. While such a defoamer will be useful when the viscosity be below about 500 cp. we prefer that the viscosity be below about 250 cp. A reasonable test is that the composition be fluid enough to pour from the viscometer cup into a jar. In actually preparing the defoamer, however, more vigorous agitation may be required. The hydrophobic silica is preferably milled into the hydrophobic oil overnight or until the Hegman gauge size is found to be below about 2 mils. In a marginal performance range the efficiency can be increased by better homogenization in the mineral seal oil.

Furthermore, since it is possible to over-cure these coatings, and especially such coatings as the hydrogen methyl polysiloxanes, we find that the viscosity of the mixture with the hydrocarbon should not be below about 50 cp. This viscosity range can be controlled to some extent by the curing time and curing temperature used in preparing the hydrophobic silica; it depends not only on the type of silicone coating but the quantity. If the cure-time is too short, the viscosity will be to high, and if the cure-time is too long the viscosity will be too low. This cure-time will depend not only on the coating used but also on the temperature of cure and on the alkalinity or acidity of the base silica. The method of heating is not critical.

For structural silicas with a low ignited loss, i.e. not precipitated from aqueous mixtures, the viscosity may be much higher, e.g. 2500 cp.

Precipitated silica bases in our examples but not necessarily subject to claiming have the following range of characteristics:

| | |
|---|---|
| Ultimate particle size, $m\mu$ | 10–50 |
| Surface area, m.²/g. | 40–800 |
| Loss at 105° C., percent | 3–8 |
| Loss at 105–200° C., percent | 0.2–2.0 |
| Loss at 200–500° C., percent | 1.0–3.5 |
| Silanol groups/$m\mu^2$ | 1.5–8 |
| pH | 1–12 |
| Bulk density, lbs./cu. ft. | 2.5–11 |
| Silica (anhydrous) percent | >85 |
| Refractive index | 1.44–1.46 |
| Oil absorption, lbs./lb. | 1.5–3 |

In one series of treatments a siloxane coating was applied to the surface by blending the required amount of a liquid siloxane (generally 8 to 20% by weight) with the micro fine precipitated silica, and after thorough blending the coated silica was finally cured.

More particularly, we find especially useful in a variety of applications hydrophobic silicas prepared from a base silica with at least about 85% of $SiO_2$, an ultimate particle size of from about 10 to 30 $m\mu$, an ignited loss of from 8 to 13%, and a maximum loss of about 6% at 105° C., and a pH of about 10.5–12.5 ($Na_2O$ 2.5–8%) and an area of about 60–170 m.²/g.

The hydrophobic silica formed by coating with a methyl silicone and curing has at least about 80% of silica, a particle size of about 13 to 30 $m\mu$, an ignited loss of about 3 to 20%, depending largely on the amount of the coating applied, a loss at 105° C. of less than about 6% and usually less than 2%, a water repellancy of about 100% and a pH of about 10.5 to 12.5, an area of about 50 to 150 m.²/g. and a viscosity of 60 to 125 cp. when tested as shown.

While the $Na_2O$ content or its chemical equivalent, e.g. $K_2O$, of a micro fine silica base may be increased by adding caustic solution to a precipitated powder and drying the alkalized powder to form a base silica having an $Na_2O$ content above about 2.5%, we find that the preferred procedure is to add alkali to the suspension or slurry of precipitated silica before separation thereof and to dry the so-formed alkaline slurry—thus obtaining a base silica at an $Na_2O$ content above about 2.5% but capable of contributing an improved performance to the defoamer composition when made hydrophobic by curing with siloxanes and the like whether by baking or by catalysis; the higher the alkali content of the base the higher the catalytic action of the alkali itself. This base silica and its method of preparation are also part of our invention. The preferred method of forming the suspension or slurry is by coacervation as described in Patent 3,208,823.

DESCRIPTION OF THE DRAWING

In Figure A the effect of forming the defoamer additive by alkalizing a predried silica (curve 1) is compared with the defoamer efficiency obtained by alkalizing the slurry before drying (curve 2) and in the lower section the effect on the particle size of the initial micro fine silica is shown when the base material is formed by alkalizing a predried micro fine silica (curve 3) and when the alkalized slurry is dried (curve 4). It will be noted that the particle size in using the dried slurry system (4) is smaller than that when using the predried alkalized system (3). A coating of 18% dimethyl polysiloxane was applied in each case.

In curve 1 the hydrophobic silica defoamer additive was prepared from a predried silica, alkalized and again dried and then coated. The maximum defoaming efficiency of 120% was reached at about 1% $Na_2O$, and at about 3% $Na_2O$ had fallen to less than 80%, but then rose to about 105% at 5% $Na_2O$ before again falling. Curve 2, on the other hand, was formed by drying on alkaline slurry before adding the polysiloxane and curing. This curve rises gradually until about 2% $Na_2O$ and then more rapidly to a maximum of about 180% efficiency at about 6.5% $Na_2O$ before dropping very rapidly to about 100% efficiency at 7.5% $Na_2O$. The value for $Na_2O$ is determined by titrating with an acid an aqueous dispersion of the base silica.

Curve 3 shows the change of particle size with alkali content of a base dried before alkalizing, and curve 4 shows that when alkalized in the slurry and then dried the ultimate particle size remains low up to an alkali content of about 6 to 7% and then rises rapidly, presumably by sintering.

Hydrophobic micro fine precipitated silica with 18% of dimethyl polysiloxane coating increases in defoaming efficiency regularly from about 90% to about 0.5% $Na_2O$ to about 180% at about 7.5% $Na_2O$ and then drops abruptly, as has been shown in the drawing. The area of the base silica also decreases regularly from about 222 m.$^2$/g. at 0.5% $Na_2O$ to about 100 m.$^2$/g. at about 7.5% $Na_2O$, and conductivity of the base rises sharply from about 1500 micromhos at 2.5% $Na_2O$ to about 4000 micromhos at about 6% $Na_2O$. The same general relationships exist over the range from about 8% to about 20% of the coating. Of course, other alkalies, such as KOH, which would give comparable alkalinity, are equivalent, and alkalized rather than slurry-dried products will be more irregular in the results obtained.

DESCRIPTION OF THE PREFERRED EMBODIMENTS

As we have stated, the preparation of hydrophobic silica and other hydrophobic solids by heat treatment of the hydrophilic base with silanes and siloxanes to form permanently affixed hydrophobic coatings is well known. These coatings remain on the surface in alkaline aqueous systems. Hydrophobic silicas are mixed with suitable vehicles for use in the defoaming of black liquors in the manufacture of paper and in latices of organic colloids such as rubber, paints, etc., and in the prevention of foaming in other aqueous compositions as, for instance, in certain food and drug preparations, e.g. for bloat in ruminants. These compostions may contain a surface active agent, but it is known that if the base silica is micro fine and has a pH between 8 and 10, i.e. 0.1 and 2% $Na_2O$, and preferably between 8 and 9, i.e. 0.1 and 0.25% $Na_2O$, the use of the surface active agent can be avoided and comparable results obtained. Furthermore, if the oil in which the silica is dispersed has polar properties, the surface active agent may also be dispensed with in some cases. These base silicas are covered with a hydrophobic coating, which will not hydrolize in water, by wetting with silanes and siloxanes and the like, and curing the coating usually by heating for a sufficient time—depending on the coating used. While it is stated that such base silicas are preferred to have a pH between about 8 and 9 if the use of the surface active agent is to be avoided, it is inferred that defoaming activity falls off above a pH of 9. In the art, no examples above a base pH of 8.9 have been shown useful for defoaming.

By chance, we employed a base silica having a pH above about 10.5 and found to our surprise that in direct opposition to the teachings in the literature such a hydrophobic silica exhibited high defoaming activity. We then prepared a series of hydrophobic silicas using, for example, a precipitated micro fine silica having a pH of 5.0, i.e. 0% $Na_2O$, and a particle size of 12 m$\mu$ and a surface area of about 325 m.$^2$/g. This silica was made alkaline by increasing additions of NaOH by the known method for increasing pH to about 10 and, as is further described below in Example 1. By this procedure we determined the curve 1 of Figure A. In these experiments we found that it was necessary in forming a satisfactory hydrophobic silica to heat the coated silica under such conditions and for such time that when dispersed in a mineral seal oil, such as Gulf 560 oil, by stirring for 2 minutes with a mechanical stirrer, the viscosity as determined with a Brookfield Viscometer using a No. 2 spindle rotating at 10 r.p.m. was below about 500 cp. and above about 100 cp.

On further experimentation, we were surprised to fiind that a preferred procedure is to raise the alkalinity of the alkaline slurry, before drying, to a range above 2% $Na_2O$, and preferably above about 4% $Na_2O$, whereby the alkalinity of the silica base is between about 4% and 7.5% $Na_2O$ and the area is between about 175 and 50 m.$^2$/g. This resulted in curve 2. The particle size while being increased above the original size of about 12 m$\mu$, curve 4, will still be less than that of a similar material formed by alkalizing the predried base, curve 3. Thus the particle size will range from about 15 m$\mu$ to about 25 m$\mu$ whereas with the dried alkalized base the particle size will range from about 20 m$\mu$ to 26 m$\mu$. Any suitable method for forming the slurry before adding alkali may be employed but we prefer the coacervation procedures mentioned above.

In this coacervation procedure residual slurry has a high pH from the sodium carbonate present, and this may be used as the alkaline slurry but it is preferred to wash and filter to remove at least part of the sodium carbonate and, in fact, we prefer to wash and filter to recover the carbonate and then raise the pH to the preferred range by adding NaOH.

As described in the prior art, any suitable method may be employed for treating the normally hydrophilic silica to render it hydrophobic. The most generally accepted method is to spray the hydrophilic silica with a silicone oil such as a dimethyl polysiloxane and then heat at a temperature from about 150° C. to about 350° C. for from a half-hour to several hours depending on the type of silicone oil used. Generally both at 10 and 18% dimethyl polysiloxane a temperature of 200–250° C. for one hour was about optimum in the range of 4 to 7% $Na_2O$. The higher the temperature, the shorter the time, and we have found also that the higher the alkalinity the shorter the time required for satisfactory curing. Another method of handling the addition of the silicone oil is to mix it with the silica in an autoclave with an internal mixer. With a dimethyl polysiloxane, for instance, using the high pH silica, the temperature may be maintained at about 200 to 250° C. for two hours after which the hydrophobic oil, e.g. the seal oil, may be added directly to the mixer. Thus, the defoamer may be inexpensively prepared. A variation in loading of silicone oil between 10 and 20% had little effect on defoaming efficiency when cured at 250° C. or lower, but the higher loading compensated in part for any over-cure. If a hydrogen methyl polysiloxane is used the temperature and times required are much lower and, in fact, if sufficient alkali, or other catalyst is present no increase in temperature may be needed. It is recognized that the curing of the silicone coating on an alkaline hydrophobic silica is at least in part a catalytic reaction with the adsorbed alkali.

While the hydrogen methyl siloxanes cure much more readily on the silica surface than do the dimethyl polysiloxanes (probably by reaction of the silanol and hydrogen) the time for adequate cure may be shortened by catalyzing the reaction. This means that less time and less capital investment is required. However, the products using different catalysts are not necessarily equivalent and some may be useful for one purpose and others for another. We have not seen evidence that others have used these catalytic reactions for curing coatings on powdered silica. A number of catalysts other than alkalies and acids have been recommended for these siloxanes. Metal soaps such as tin octoate, lead naphthenate and dibutyl tin dilaurate are known catalysts for these reactions. We have found the 28% tin octoate to be most successful. With the tin octoate we were able to obtain cure with the dimethyl siloxane at room temperature if sufficiently long times, such as two weeks, were allowed, whereas silica at the same alkali content without the catalyst required treatment at about 200° C. for several hours.

In preparing the silica bases the metallic soap catalyst may be added to the slurry of silica at the high or low pH, the mixture then dried and coated with the silicone. With L–31 silicone oil, for instance, such products may be cured at room temperature, and with L–45 silicone oil in a much shorter time at higher temperatures.

These finely divided silicas are also rendered hydrophobic by treatment with vapors of organosilicon halides and mixtures of organosilicon halides especially alkyl aryl and aryl alkyl silicon halides rather than the more simple silanes. The amount of treating material and the length of treatment will depend on the surface areas and the nature of the organo silicon halide or silane employed. The general nature of these treatments is well known in the art. A further method of rendering the silica hydrophobic is by dispersing it in a silicone oil and heating the dispersion at the necessary temperature for a necessary time—again depending on the characteristics already set out. The hydrophobic silica may be separated from the silicone oil after treatment or the mass may be used directly as an additive in preparing the defoaming mixture. It is also possible to add the silicone oil to the slurry prior to drying.

The preferred coating is a polysiloxane oil described as an alkyl, aryl, alicyclic, or aryl-alkyl siloxane or polysiloxane and having a viscosity from about 10 cst. to about 3000 cst. at 25° C. Typical alkyl polysiloxanes include dimethyl polysiloxane, diethyl polysiloxane, dipropyl polysiloxane, methylethyl polysiloxane, dioctyl polysiloxane, dihexyl polysiloxane, methylpropyl polysiloxane, dibutyl polysiloxane, didodecyl polysiloxane and hydrogen alkyl polysiloxane e.g. hydrogen methylpolysiloxane. These may be used in amounts from about 5 to 25% and preferably from about 8 to 18% based on the weight of the silica component.

A defoaming composition ordinarily comprises from about 70 to 97% of a water insoluble organic liquid selected from the group consisting of kerosene, naphthenic mineral oil, paraffinic mineral oil, chlorinated naphthenic mineral oil, chlorinated paraffinic mineral and liquid difluorovinyl chloride polymer.

The liquid aliphatic, alicyclic, or aromatic hydrocarbons suitable for use in the practice of this invention are liquids at room temperature and atmospheric pressure and have a viscosity of about 30 SUS to 400 SUS at 370° C. and a minimum boiling point of at least 65° C. and contain 6 to 25 carbon atoms.

Hydrocarbons such as benzene, hexane, heptane, octane, mineral seal oil, naphtha, naphthenic mineral oil, paraffinic oil and mineral oil, etc., are examples of some of the compounds which have been found suitable for use as the liquid hydrocarbon component. Of course mixtures of two or more of these or similar hydrocarbons may be employed. From about 3% to about 30% of finely divided hydrophobic silica is suspended in the organic liquid. The mixture of the silica with the hydrocarbon oil is thixotropic. The structure may be broken by homogenization or heating, or ultrasonic mixing or similar devices. These compositions may be used in such a form or may be emulsified. While we prefer to employ these defoaming compositions as dispersions of hydrophobic silica in hydrocarbons, they are also useful when prepared as emulsions as shown in the prior art.

These defoamers are especially adapted to defoam aqueous systems which contain foam-producing solids such as latex glues, resinous materials, starches, etc. The defoaming compositions are used in amounts of from 0.01% to about 0.5% by weight of the dry foam-producing solids in the aqueous system. Alternatively the said defoaming composition is added in a small amount of at least 1 p.p.m. and from about 0.003 to about 0.5% to the aqueous system in which it is desired to prevent foaming.

The defoaming ability of these compositions was evaluated by comparing their ability to defoam a concentrated black liquor obtained from a paper mill with the defoaming ability of a standard defoaming composition described below in "Preparation of Defoamers." As may be seen from the curve 2 of the slurry dried material in FIG. A, the alkali base silica with between 0.1 and 2% $Na_2O$ formed by drying an alkaline slurry is not as effective as the standard defoamer nor is it as effective as a product in this range (curve 1) formed by alkalizing a predried base, as described in the prior art. It is noted, however, that prior art alkalized products drop to a low efficiency of below 80% as the alkali in the silica approaches 3%. However, if the base silica is alkalized further to contain about 4% and up to approximately 5% $Na_2O$, the defoaming efficiency again increases to about 100% but usually does not go as high as the maximum in the lower alkali range.

Furthermore, as the alkalinity of the silica goes above about 5% the efficency again falls off, whereas for the dried slurry the efficiency continues to rise from about 2% to 6.5% $Na_2O$ or perhaps higher, and is still good at at least 7%. Above this range we hypothesize that sintering becomes dominant and aggregation occurs to such an extent that the performance diminishes drastically. We believe that these curves may be explained on the basis that when a micro fine dried silica (i.e. predried) is treated with alkali (i.e. alkalized) and then again dried the alkali leaves less of the very fine precipitated spray dried silica than in the case of the slurry dried silica. It also provides more free alkali on the surface which may catalyze the reorganization and orientation of the polysiloxane coating during curing and also may be available for aiding in dispersion in the organic oil. At about 2% $Na_2O$ sintering appears to become of importance and the effectiveness of the alkalized silica is reduced until at apparently above about 3.5% $Na_2O$ the catalysis of the silicone reaction which occurs at high pH again increases the efficiency until at about 5% $Na_2O$ it again rapidly falls off. When, however, the original slurry is made alkaline and then the slurry is dried, the alkali is well distributed and probably trapped within the aggregates and the effect on the structure is greater than that caused by coating the dried silica with more alkali. Apparently because of this distribution of the alkali the coated silica dried from a slurry does not disperse well in the oil and, in fact, it may not have as good a catalytic effect in curing the siloxane coating. However, as the alkalinity of the products dried from the slurry increases above about 3% $Na_2O$ the catalytic reaction at high pH becomes great and the product becomes much more active until above about 7% the alkali again is too strong and attacks the silica, causes considerable sintering, and probably catalyzes a complete degradation of the coating. In support of this theory, we have found thermogravimetric analysis (TGA) data which shows that the hydrophobic silica formed by coating a silica dried from a slurry at a high alkalinity has a permanent increase in rate of loss at about 170° C. We believe this is a breakdown of an alkali hydrate which forms on exposure to moisture in the air; whereas with a hydrophobic silica formed from a base product which was dried at about 0.1% $Na_2O$, and thus apparently has little excess alkali, no such break in the curve occurs. Products which show this break also have a poor catalytic action on the silicone coatings. A similar break in the TGA curve has been found for an alkalized silica with 5.5% $Na_2O$, whereas with such an alkalized product at about 3% there appeared to be no such development. Other curves seem to bear out this phenomenon.

Furthermore, the particle size of the alkali base silica correlates with the above explanation. The particle size of the alkalized base increases with alkalinity to about 1% $Na_2O$, which is the point of maximum defoaming in this system, and then falls off as the NaOH is increased above about 1% $Na_2O$ to a minimum at about 3% $Na_2O$. This appears to be associated with agglomeration of the original silica base through crystallization of the excess NaOH hydrate and the fall in particle size appears to indicate some reaction with the silica as the alkalinity reaches in the neighborhood of 3. However, above about 3.5% Na₂O the reaction appears to become more vigorous with sintering and massive agglomeration as particle size rises continuously from that point.

An additional advantage in the process of producing the base silica at above 3.5% is that curing of the siloxane coating can be accomplished much more readily. For example, a dimethyl polysiloxane coating cures in about an hour or two compared to 16 or 20 hours at a comparable temperature for the less alkaline base silica. We have also found that with hydrophobic silicas formed from base silicas at above 3.5% $Na_2O$ less coating is required in order to obtain efficiencies similar to that of the standard material. Thus where a low alkali base at 0.5% $Na_2O$ might require 18% of the dimethyl polysiloxane, a base silica with 3.5% $Na_2O$ would require 10% or even lower to give 100% defoaming efficiency.

When the products of our invention are dispersed in 10% HCl or $H_2SO_4$ acid solutions they show no loss of water resistance or noticeable separation of the coating oil.

Furthermore, we have found that the addition of spreading agents or other surface active agents was usually not helpful with our improved defoaming systems. Triethanolamine stearate, for instance, had no effect on defoaming at either the 10% or 18% silicone oil loading of the base silica. In some cases where the silicone oil coating was low, as for instance below about 10%, some surface active agents showed some improvement over systems without the surface active agent. It is well known that specific water insoluble organic liquids used as the vehicle or continuous medium of the defoamer cause variations in the effectiveness of the defoamer, one being more satisfactory with one black liquor for instance and another with another black liquor, but the hydrophobic silicas of our invention have always been the preferred suspensoid.

It should be recognized that it is intended that the detailed description and specific examples are not limiting but merely indicate preferred embodiments of this invention since various changes and modifications within the scope of the invention will become apparent to those skilled in the art.

The following materials were or may be employed in the examples:

Dimethylpolysiloxane fluid, at 25° C.
Viscosity 50 cst.:
  L–45 a trademark of Union Carbide Corp.
  200 fluid a trademark of Dow-Corning Co.
  SS–96 (50) a trademark of General Electric Co.
  SS–101–50 a trademark of Stauffer Chemical Co.
Viscosity 350 cst.: Si-O-Sil a trademark of Stauffer Chemical Co.
Methylhydrogenpolysiloxane with viscosity of 20–40 cst. at 25° C.
  L–31 a trademark of Union Carbide Corp.
  Dry Film 1040 a trademark of General Electric Co.
Vinyl tris (2 methoxy ethoxy) silane: GESC 3933 a trademark of General Electric Co.
Dibutyl tin dilaurate: Niax Catalyst D–22 (Flexol D22) a trademark of Union Carbide Corp.
Tin octoate 28%: Nuodex, Nuocure 28 trademarks of Nuodex Division of Tenneco Chemicals, Inc.
Mineral seal oil: Gulf 560 trademark of Gulf Oil Corp.
  Gravity—26.7° API
  Specific gravity—0.894 60° F./60° F.
  Viscosity—70° F., 137.5 SUS—100° F. 72.5 SUS
  Flash point open cup—310° F.
  Pour point— —65° F.
  Neutralization value total acid No.—0.01.
  Aniline point—165° F.
Mentor 28 oil a trademark of Esso Division of Humble Oil & Refining Co.
Sulfate black liquor containing approximately 16% solids supplied by P. H. Glatfelter Co., Spring Grove, Pa. and also by Albermarle Paper Manufacturing Co.
Sodium salt of a naturally occurring polymer produced from wood, i.e. a polymeric lignin derivative with about 10% of sodium, and free of wood sugars and similar degradation products in the form of a brown amorphous, free-flowing powder with an ash content of 20–30%, a pH of 9.5–10.6, a methoxyl content of about 11.5%, and a sintering point at about 455° F.—Indulin C, a trademark of West Virginia Pulp & Paper Chemical Division.
Sodium rosin soap: Dresinate TX, a trademark of Hercules Inc.
Sodium lauryl sulfate: Dupanol C, a trademark of E. I. du Pont de Nemours & Co.
Sodium salt of the sulfonate of oleic acid: Sul-fon-ate OA 5, a trademark of Tennessee Corporation
Alkyl aryl sulfonate:
  Nacconol NRSF, a trademark of Allied Chemical Corp.
  Benax 2Al, sodium dodecyl diphenyl ether disulfonate, a trademark of Dow Chemical Co.
Benzoyl peroxide, 50% in a silicone oil, Kadox BSG, a trademark of Cadet Chemical Co.

Preparation of alkalized silica: In this procedure, which follows that described in U.S. Patent 3,207,698, powdered hydrated micro fine silica (e.g. QUSO A or B) was causticized in a high intensity blender by adding 10% and 20% NaOH solutions during the blending until a thorough, even dispersion was obtained. The causticized silicas were again dried in an oven overnight at 105° C. and then allowed to cool to room temperature. The per-

| Trademarked micro fine silica | Trademark owner | Ultimate particle size, mμ | Surface area, m.²/g. | Na₂O content, percent | pH | SiO₂, percent |
| --- | --- | --- | --- | --- | --- | --- |
| Hi Sil: | | | | | | |
| 404 | PPG Industries | 50–130 | 40–50 | 1.2 | 9–10 | 85 |
| 233 | do | 22 | 140 | 0.4 | 7.1 | 90 |
| Cab-O-Sil M5 | Cabot Corp | 12 | 200±25 | 0 | 3.5–4.2 | 99 |
| Zeosyl 100 | J. M. Huber Corp | 15 | 195 | 0.3 | 6.3 | 99 |
| QUSO: | | | | | | |
| A | Philadelphia Quartz Co. | 13 | 242 | 0.1–0.5 | 8.5 | 98 |
| B | do | 12 | 367 | 0.03 | 5.1 | 98 |
| C | do | 16 | 217 | 0 | 4.3 | 98 |
| D | do | 13 | 300 | 0.5 | 8.5 | 98 | cent Na₂O was then measured on both damp and dry materials as a 5% silica suspension in distilled water.

The dry alkalized silicas were recharged to the blender and coated with 18% of L–45 silicone oil based on the weight of the dry silica, unless otherwise stated. The oil was added over a period of several minutes and then high intensity blending was continued for 15 minutes. The coated silicas were cured in open pans in an oven with forced circulation at 200° C. for 16–18 hours.

Preparation of alkaline slurry dried silicas: Batches of silica were prepared by drying the slurry of Patent 3,208,823 after causticizing with a dilute NaOH solution. The pH of the dried silica varies from about 0.3 higher than the pH of the slurry to 0.3 lower than the pH of the slurry. The slurry dried silicas were then air milled and coated in the high intensity mixer as in the above method (unless otherwise stated) with 18% of L-45 silicone oil and were cured for 18 hours at 200° C.

Catalytically cured silicas: Catalysts for curing the coating of silicone oil were blended with the silicone oil and then the oil was added to the micro fine silica in a cylindrical container and mixed using a four-bladed propeller for about a minute. The coated silicas were then allowed to roll in the cylindrical container overnight and allowed to stand until completely hydrophobic.

In some instances the catalyst was first blended with a portion of the silica, and this master batch was then blended with the main portion of silica coated either before or after with the silicone oil. These products after curing were tested for water repellency by shaking with distilled water and for defoaming activity both as described fully below.

Preparation of defoamers: Ten parts by weight of each coated silica was mixed in a ball mill with 90 parts by weight of petroleum oil, e.g. seal oil, for 16 to 18 hours with the liquid just covering one-inch stones. This treatment reduced the silica aggregate size to less than 2.0 mils and usually 0.5 to 0.7 mil as determined by a Hegman gage.

Defoaming efficiency: An outlet was fused on to the base of a 1000 ml. aspirator bottle and connected with a rubber hose to a centrifugal pump. This pump was used to continuously cycle the concentrated black liquor from the bottle to the pump and back into the top of the bottle. The pumping was carried out at a rate so that the black liquor in the beaker is agitated by the re-entering liquid to such an extent that foam appears. In practice, the rate is approximately 2 gallons per minute. The concentrated black liquor enters the bottle at a point of about 2.25 inches above the surface of the liquid in the bottle and strikes the surface of the liquid in the bottle at an angle of 90°.

In carrying out the testing of the defoamer compositions, 500 ml. of concentrated black liquor at 180° F. (83° C.) and containing usually about 16% by weight of solids was placed in the beaker of the apparatus. The temperature was stabilized with the pump running. As many tests as possible were carried out with the same black liquor but these liquors are not stable and new liquors need to be substituted from time to time. Thus it is important to compare the defoaming efficiency against a standard defoaming composition. The liquid when quiescent and at a temperature of 180° F. filed the beaker to a level of about 3¼ inches from the bottom. This level was marked with the pump running and labeled the zero line. Then 0.20 ml. of the defoaming composition was pipetted into the beaker containing 500 ml. of the concentrated black liquor at 180° F. The temperature was maintained at approximately 180° F. during the operation of the test. The bottle was swirled to disperse the added defoamer. In operation, the pump and stopwatch were started simultaneously. The time, in seconds, for the foam to form and rise to the one-inch level above the zero point was recorded. This time is an indication of the defoaming ability of the defoamer which is being tested and is directly proportional to defoaming efficiency. The longer the time required for the foam to form and rise to the indicated mark, the better is the defoaming action of the defoamer. This value was taken as 100% when determined with a standard defoaming agent which will require 180 seconds for the foam to reach the one-inch mark. As a kind of base line, a heated black liquor without defoaming agent had an "efficiency" of 24% when tested in this way.

Products tested in comparison with this standard were then rated based on the percentage of the value obtained with the standard defoaming material. Thus if the defoamer under test took twice as long to produce the foam with the same height, it was said to have a defoaming efficiency of 200%, whereas if it took half as long it had a defoaming efficiency of 50%. Check runs were made with the standard at least once a day. The test black liquor was stored in a refrigerator and purged with nitrogen each day.

The viscosity test.—Viscosity (cp.) was measured on a suspension of 10% by weight of the particular hydrophobic silica in a mineral seal oil from the Gulf Oil Co. known as "560." The silica-oil composite was mechanically agitated, e.g. in a Bodine mixer, for 2 minutes and allowed to stand 5 minutes before measurement. The measurement was made with a Brookfield Viscometer, using spindle #2 at 10 r.p.m.

Water repellency test.—The water repellency was measured by shaking a weighed portion of the silica with water. Specifically, 5 grams of the silica powder was shaken vigorously with 150 ml. of water for 1 minute in a 250 ml. glass stoppered graduate. The graduate was allowed to stand 5 minutes and then was reshaken for one-half minute. After equilibrium was established, the graduate was tapped gently and the distribution of the powder and water was observed and the level of the interface was recorded in milliliters.

If the liquid phase was clear, then some of the floating phase was removed to a platinum crucible and the ignition loss determined. If, on the other hand, some of the silica was suspended in the aqueous phase, the system was transferred to a separatory funnel and the liquid phase was removed with the settled silica. The graduate was rinsed out with 50 ml. of water and this, plus a subsequent 50 ml. of increment of water, was used to scrub the powder in the separatory funnel and was then added to the bulk of the liquid phase. The residue was dried and weighed.

Extraction tests.—For the extraction test, 10 grams of the coated powder were shaken vigorously for one-half minute with 100 ml. of acetone in a 250 ml. stoppered graduate. After standing 5 minutes, the graduate was reshaken for a half minute. Any settling which occurred at equilibrium was recorded. The dispersion was poured onto a cloth lined Buchner funnel, evacuated and washed with 220 ml. increments of acetone. The filtered cake was then dried, ground in a mortar, and the water repellency test above was performed on 5 grams of the resultant powder. The filtrate was evaporated and residue weighed.

Heat stability test: For the heat stability test, 10 to 15 grams of the powder were placed in an oven at 260±5° C. for 16 to 24 hours and the water repellency test was then performed.

Stability test: Stability tests were performed by adding 10 grams of powder into a small "Waring Blendor" and then a 10% hydrochloric or sulfuric acid solution was added into the blender. The lid of the blender was held in place and mixing started slowly. Mixing continued for 1 minute. The mixture was then poured into a 250 ml. graduate and the level of the interface at equilibrium was recorded. Furthermore, any settling, cloudiness or floating oil in the liquid phase was also recorded.

Example 1

A base silica for our hydrophobic silica is suitably prepared according to the methods shown in U.S. Patent 3,208,823 which is hereby incorporated by reference in our application. Said patent describes methods of preparing finely divided hydrated silica by forming a protocoacervate from a soluble silicate solution using coacervating agents such as highly soluble salts, especially the univalent inorganic salts, completely water miscible hydrogen bonding agents as, for example, simple alcohols and ketones, and highly soluble nitrogen bases such as ammonia and amines. The processes involved in the preparation of the product of this application differ in that the $Na_2O$ content of the slurry is raised until the pH is from 10.0 to 12.0, and preferably from 10.5 to 11.5, by the addition of alkali as, for instance, NaOH or KOH after the initial precipitation of the hydrate by addition of an insolubilizing agent to the protocoacervate. The insolubilizing agent is an acidic material having an anion of an acid stronger than silicic acid and capable of precipitating substantially pure silica from the mixture. Less broadly, an aqueous solution of sodium silicate having a weight percent ratio of $Na_2O$ to $SiO_2$ in the range of from about 2:1 to 1:4 and a sodium silicate solids concentration of from about 0.5 to 30% $SiO_2$ is contacted with a coacervating agent capable of clustering aqueous sodium silicate solutions and an insolubilizing agent consisting of an acidic material having an anion of an acid stronger than silicic acid and capable of precipitating substantially pure silica from the mixture and introducing said coacervating agent in a quantity within the range of 20 to 500% of the equilibrium opalescence ratio; and introducing the insolubilizing agent in a quantity sufficient to precipitate gel-free silica, and maintaining the environmental conditions substantially uniform in the above mixture while the finely divided silica products are in formation by mixing said coacervating agent with said sodium silicate solution not later than said insolubilizing agent is mixed therewith and completing the mixing in of the insolubilizing agent before the appearance of any substantial amount of a silica precipitate, and in any event within a period not substantially exceeding 5 seconds, and following completion of the mixing in of the insolubilizing agent and the appearance of the silica precipitate adding thereto a soluble alkali, such as for instance NaOH or KOH, in the amount of from about 2.5 to 8% $Na_2O$ based on the weight of silica thereby raising the pH of the so-formed slurry to a pH within the range of 10 to 12 and recovering the finely divided silica thereby produced. The hydrated silica may be recovered by known processes, such as filtration, and dried in air, or the slurry may be spray dried, etc. The excess of soluble salts may be removed either before or after adding the alkali.

The product of this process is a finely divided precipitated silica capable of forming a defoaming agent with a defoaming efficiency above 100% as compared with the standard defoaming agent when incorporated in the amount of 10 parts by weight by milling into 90 parts by weight of a petroleum hydrocarbon oil until the aggregate size of the silica particles is less than 1.5 mils as determined by a Hegman gage.

The preferred hydrophobic alkaline silica of our invention is a pigment having a particle size within the range of 15 to 50 m$\mu$, a titratable $Na_2O$ content between about 2.5 and 8%, a pH (as determined in 50% isopropyl alcohol and $H_2O$ with KCl) within the range of 10.5 to 12, being coated with from 8 to 20% of a silicone taken from the group of alkyl polysiloxanes, aryl polysiloxanes and arylalkyl polysiloxanes and alicyclic polysiloxanes.

In this example, 17,000 parts by volume of a sodium silicate solution having a concentration of 0.0198 gram of $Na_2O$ and 0.0638 gram of $SiO_2$ per ml. was mixed with 12,250 parts by volume of an ammonium carbonate solution at a concentration of 0.0997 gram of $NH_3$ and 0.0878 gram of $CO_2$ per ml. This solution thus contained 3.5% of $SiO_2$, 3.9% of $NH_3$ and 3.47% of $CO_2$. These two solutions were mixed by feeding the two solutions simultaneously through a nozzle with a pressure drop of 45 p.s.i. in which the nozzle had an inside diameter of 0.5 in., and further mixing occurred in 13 ft. of 0.375 inside diameter tubing, and an additional 6 ft. of 1-inch inside diameter tubing. The output from this mixing device was retained in a vessel for 2 minutes and air was pumped into a mixing chamber where 135 gallons was made up to 405 gallons with tap water, and this diluted slurry was stripped of $NH_3$, neutralized, filtered, washed on the filter and reslurried to a solids content of 0.02 gram per ml. The slurry was refiltered and washed and the filter cake was then reslurried at a concentration of 10% and about 2.5% of $Na_2O$ based on the weight of $SiO_2$ was added as a dilute NaOH solution thus raising the pH to 10.5 and the alkaline slurry was spray dried. This formed a base material having a pH of about 10.6 and containing about 2.5% $Na_2O$ based on the precipitated silica hydrate.

A series of such products of varying alkali content was prepared as shown in Table I. Each of these products was then coated according to the standard procedure with 18% of the L-45 silicone, dimethyl polysiloxane, and cured according to the standard procedure. These hydrophobic coated products had the defoamer efficiencies as shown in the table.

TABLE I.—PROPERTIES OF BASE SILICAS

| Lot No. | pH | Ignited loss | Loss at 105° C. | Particle size, m$\mu$ | Surface area, m.²/g. | $Na_2O$, percent | Defoaming efficiency | |
|---|---|---|---|---|---|---|---|---|
| | | | | | | | 18% | 10% |
| 1 | 6.4 | 8.8 | 4.4 | 11 | 301 | 0.12 | 40 | |
| 2 | 8.0 | 7.9 | 3.8 | 12 | 235 | 0.47 | 96 | |
| 3 | 9.0 | 7.4 | 3.6 | 12 | 154 | 1.01 | 140 | 26 |
| 4 | 9.8 | 7.3 | 3.6 | 13 | 167 | 1.74 | 134 | |
| 5 | 10.4 | 7.8 | 3.8 | 14 | 180 | 2.55 | | |
| 6 | 10.6 | 7.4 | 3.3 | 13 | 112 | 3.71 | 158 | 136 |
| 7 | 11.1 | 8.3 | 3.0 | 16 | 144 | 4.71 | 141 | |
| 8 | 11.0 | 13.4 | 8.1 | 20 | 48 | 5.63 | 128 | |
| 9 | 11.4 | 10.1 | 4.9 | 17 | 124 | 5.64 | 167 | |
| 10 | 11.7 | 10.3 | 4.4 | 22 | 69 | 8.6 | 104 | |

This data shows the increase in defoaming efficiency for a fresh black liquor with increasing alkalinity of the base silica to a maximum between about 2.5 and 6.0. The actual peak point will vary with the conditions of curing and drying. We found, for instance, that in the alkali range of 0.5 to 1.0 with both 10 and 18% coatings that improved defoaming efficiency was obtained as the curing temperature was raised to 280° C. but a slight over-curing appeared to occur at 300° with a 10% coating. The effect of over- and-under-curing was especially noticeable with the 10% coating. At higher pH ranges a temperature of about 200 to 250° C. appeared to be optimum. A higher coating level appears to compensate to some degree for overcuring at higher temperatures.

We have also found that when the alkali is in the range of 0.5 to 1.0 a higher loading is necessary in order to give defoaming efficiencies greater than 80%. At higher alkali content, with a cure temperature of about 250° C. the level of loading with the coating, whether 10 or 18%, made little difference. Thus with a base in the range of about 2.5 to 6.0% $Na_2O$ optimum defoaming may be obtained with a coating as low as 8 to 10%.

With 1.0% $Na_2O$ on the silica, however, and with curing at 200° C. for 18 hours, the efficiency was only 20% with a coating of 8% L-45 silicone and 25% at 10% of L-45. The efficiency, however, rose rapidly to 140% at 18% of L-45.

Triethanolamine stearate had no effect on defoaming at either the 10 or 18% loading when the base had 2.5% $Na_2O$. However, sulfonated oleic acid did improve the defoaming efficiency by 20% with the lower coating range, but no improvement was observed with an 18% coating.

Example 2

In this example slurries were prepared as described in Example 1, above, and the slurry was adjusted with NaOH at the pH shown in the following table. The precipitated silica was then separated from the slurry and dried and had the properties shown in the table below. This dried hydrated silica was then coated with 18% of L–45 silicone oil in a Waring Blendor and cured 18 hours at 200° as previously described and then tested for its defoaming efficiency, with the results again shown in the last column of the following Table II and also in FIG. A. As in Example 1, no dip in the efficiency curve was found at approximately pH 10.

| Defoamer: | Number of cycles |
|---|---|
| (1) L–45 silicone alone | 1 |
| (2) L–31 silicone alone | 3 |
| (3) Dow Corning 200 silicone alone | 2 |
| (4) Pyrogenic silica with 15% of L–45 cured 18 hrs. at 210° C. | 3 |
| (5) Micro fine precipitated silica at pH 5 with 15% of L–45 cured 18 hrs. at 210° C. | 4 |
| (6) pH 8.5, slurry dried silica+L–45 cured as in 5 | 6 to 7 |
| (7) Micro fine precipitated silica pH 7 hydrophobic according to Patent 3,076,768 | 5 |
| (8) Micro fine precipitated silica pH 4 plus 15% L–31 (cured 7 hrs. at 240° C.) | 5 |

TABLE II.—PROPERTIES OF BASE SILICA

| Silica Number | Slurry pH | Loss at 105° C., percent | Ignited loss, percent | Particle size, mµ | Surface area, m.²/g. | Defoaming, percent of efficiency |
|---|---|---|---|---|---|---|
| 11 | 9.5 | 6.0 | 9.7 | 12 | 300 | 79 |
| 12 | 10.0 | 6.8 | 9.9 | 15 | 184 | 87 |
| 13 | 10.5 | 6.7 | 10.4 | 16 | 192 | 97 |
| 14 | 10.7 | 6.7 | 8.6 | 18 | 130 | 103 |
| 15 | 10.9 | 6.8 | 8.7 | 18 | 128 | 105 |
| 16 | 11.2 | 5.9 | 9.7 | 15 | 117 | 138 |
| 17 | 11.4 | 6.5 | 11.6 | 26 | 50 | 77 |

Example 3

A slurry prepared by coacervation as in Example 1 was increased in alkalinity with NaOH and a dried micro fine, hydrated, precipitated silica with a high pH, i.e. high $Na_2O$ content, was prepared. It had approximately the following properties:

| | |
|---|---|
| Ultimate particle size, mµ | 18 |
| Alkali ($Na_2O$) percent | 4.4 |
| Surface area, m.²/g. | 148 |
| Ignited loss, percent | 7.8 |
| Wet sieve residue, percent | 0.1 |
| Loss at 105° C., percent | 3.1 |

Similar bases had $Na_2O$ 5.3%, area 140 and conductivity of 3300 micromhos/cm.², and $Na_2O$ 7.6%, area 113 and conductivity of 4600 micromhos/cm.², and particle size of 22 mµ. The latter was made alkaline with 50% each of $K_2O$ and $Na_2O$.

This micro fine silica was blended with 15% of L–45 silicone in a high intensity blender for about 2 minutes. The blended product was then cured for 16 hours at 317° C. in a direct gas-fired furnace. The cured product was 100% water repellent and had an ignition loss of 3.7% and a loss at 105° C. of 1.4%. Its pH determined in 50% isopropyl alcohol and $H_2O$ was 11.0 and the bulk density was 3.9 #/ft.³. The particle size was about 19 mµ, the surface area was about 182 m.²/g. and the viscosity when blended in Gulf 560 oil was about 500 cps.

It is well known that hydrophobic silicas dispersed in mineral oil make good defoamers for black liquor formed in the manufacture of paper. If the original silica has a pH of 8 to 10, or if a surface active agent is added to a silica of lower pH, the hydrophobic silicas will perform well.

To test the use as a defoamer in this case, we used Pexol resin solution. Pexol is a trademark of Hercules Powder Co. 100 cc. of 2.5% Pexol is placed in a 600 cc. beaker and 2 drops of defoamer is added. The solution is then stirred at high speed for 30 seconds and allowed to rest for 30 seconds. The cycle is repeated until the foam rises to 8–9 centimeters. The larger the number of cycles required to produce a foam of 8 or 9 centimeters the greater is the defoaming ability. The following table gives comparative data;

To test relative effect as a defoamer, the products No. 6 and 7 and the product of this example were used to form a 10% dispersion in Gulf mineral seal oil #560 and used with a sample of black liquor from the paper industry. In this case the time for the foam to rise was measured:

| Defoamer: | Time for foam to rise |
|---|---|
| No. 7 (above) | 3 min. 9 sec. |
| No. 6 (above) | 2 min. 55 sec. |
| Product of this example | 3 min. 55 sec. |

Example 4

In another series of tests finely divided silica hydrates were precipitated from solution, as in Example 1, forming finely devided hydrated precipitated silicas having a pH ranging from about 4 to about 10.6, about 15 mµ particle size, and surface area about 150 m.²/g. This hydrated silica was treated with L–45 silicone or with L–31 silicone and heated as shown in the table forming hydrophobic silica having a particle size of 18–22 mµ and a surface area of 100–150 m.²/g. which, when combined with mineral oil and used as a defoaming agent, had a defoaming ability shown in the table as the time to rise to the one inch level, as determined by the standard test for defoamers.

The siloxane was applied and bound to the surface. For the methyl polysiloxane we used temperatures in the range of 245° C. for from one hour to 10 hours and found that at the higher alkalinities of the base silica the reaction is much more rapid than with alkalinities in the range of 8 to 10, so that the preparation of the hydrophobic silica is expedited. With the hydrogen methyl polysiloxane, lower temperatures are necessary and we have used approximately 145° C. for periods of 1 to 10 hours. In some cases longer times of heating are detrimental as the alkali appears to react with the siloxane and causes a breakdown to volatile components which are then lost from the silica. Examples of these conditions are also shown in the Table III, below.

In a number of other tests for comparative defoaming ability of hydrophobic silica we found that a base of precipitated silica ranging in pH from 4 to 5 would not perform better than a system without added surfactant. This applies to pyrogenic silica and xerogel also.

If the base is raised to a pH of 7 the defoaming ability is doubled whether the base is precipitated silica or xerogel. Addition of a wetting or surface active agent does increase the defoaming ability.

TABLE III

| pH of base silica as precipitated | Silicone oil | Percent of oil by wt. of silica | Curing temp., °C. | Curing time in hrs. | Viscosity in Gulf #560 oil | Defoamerability in second |
|---|---|---|---|---|---|---|
| 10.6 | L-45 | 15 | 245 | 1 | 220 | 50 |
| 10.6 | L-45 | 10 | 245 | 10 | 160 | 49 |
| 7 | L-45 | 15 | 245 | 10 | 580 | 34 |
| 10.6 | L-31 | 15 | 145 | 1 | 120 | 32 |
| 10.6 | L-31 | 15 | 145 | 10 | 60 | 0 |
| 7 | L-31 | 15 | 145 | 10 | 1,160 | 27 |
| 4 | L-31 | 15 | 145 | 20 | 1,640 | 27 |
| 4 | L-31 | 15 | 145 | 1 | -------- | 18 |

At about pH 8.5, the defoaming ability may be increased six times and the addition of surfactants may help further, but using precipitated silica slurry dried base at about a pH of 10.5 to 11, the defoaming ability was increased 9 or 10 times and the addition of surfactants usually had no effect.

Example 5

In tests in which the pH of the base silica was 10.5 to 10.7 as in silica #14 of Example 2 and comparison was made with the standard defoamer using an 8% solution of Indulin C instead of the black liquor, at a loading of 10% L-45 silicone the defoaming efficiency was 110%, and at a loading of 8% the efficiency was 99%, while with a loading of 7% the efficiency was only 60%.

Example 6

An increment of a 10% NaOH solution was added as described to portions of the base silica, QUSO B and dried prior to coating with the silicone oil. The following Table IV shows alkali and the pH of the dry base silica after adjustment with the NaOH, and the defoamer efficiency and other properties of the coated hydrophobic product after heat-treatment. The defoamer efficiency is also plotted as the alkalized silica in FIG. 1. For those base silicas having an alkalinity greater than 0.1% $Na_2O$, a 20% caustic solution was used in order to reduce the time required to evaporate the excess water and thus reduce the possible effect of the alkali on the particles of the base silica.

After adjustment with alkali and drying of the base silica, 1.6 parts of dimethylpolysiloxane was added slowly, with intensive mixing in the Waring Blendor, to 8.9 parts of the alkaline base silica. This powder coated with about 18% L-45 silicone was then heated for about 16 hours at about 195° C.

This hydrophobic silica was then thoroughly dispersed with agitation into 89.5 parts of Gulf Oil #560 mineral seal oil.

Example 7

In one example a slurry dried base silica having an alkalinity of about 4.0% $Na_2O$ was coated with 25% of methyl hydrogen silicone oil and Nuocure 28 as a catalyst. A masterbatch was first prepared using 25% of the catalyst and 75% of base silica. Two parts of this was blended and then pre-mixed with 98 parts of the high pH hydrated base silica powder, and this mixture was then coated with 25 parts of the L-31 silicone in the same blending equipment. It is preferred to follow this order of the addition of the catalyst in oil. It is generally preferred to mix the oil with the base silica and then to combine this with a catalyst masterbatch. In this case with a high pH base with about 12% ignited loss, a cure to 100% water repellency was obtained in 3 hours at room temperature. When tested in a solution with 8% Indulin C, the defoamer made from this hydrophobic silica had an efficiency of 120% and 104% in a black liquor.

As we have mentioned above, base silicas with a pH of about 5 to 8 are much more difficult to cure than those of higher pH. Silicas in the range of 8 to 9 are also more difficult than those having a pH above 10. For instance, QUSO A with a pH of 8.5 and 10% of L-45 silicone as a coating cured completely in 16 hours at 200° C. However, when 3 p.b.w. of the catalyst Kadox BSG (1.5 p.b.w. of benzoyl peroxide) was added to L-45 silicone and 10% added to 100 p.b.w. of the silica by tumbling 16 hours, only 6 hours was required for curing, whereas 100 p.b.w. of QUSO B at a pH of 5 with 10% of a mixture of L-45 and 3 p.b.w. of Kadox BSG catalyst had no water repellency at all after 6 hours at 200° and only a trace after heating at 150° for an hour and a half using 2% by weight of Nuocure 28 added to the L-45. The QUSO B with 10% of a mixture of L-31 silicone with 3% of Kadox BSG catalyst on the weight of silicone had no water repellency after heating for 6 hours at 200°.

QUSO A, on the other hand, had 100% water repellency with 10% of a mixture of L-31 silicone and 3% of Kadox BSG catalyst on the weight of silicone after heating for 6 hours at 200° C. QUSO A with 10% of a mixture of L-31 silicone with 2% of lead octoate had

TABLE IV

| | Hydrophobic base | | | Finished hydrophobic product | | | |
|---|---|---|---|---|---|---|---|
| Percent $Na_2O$ | pH | Area | pH | Area, m.²/g. | Particle size, mµ | Ignited loss, percent | Defoaming efficiency, percent |
| 0.05 | 8.1 | 280 | -------- | 138 | -------- | -------- | 62 |
| 0.1 | 8.5 | -------- | 8.4 | 103 | 18 | 13.3 | 54 |
| 0.1 | 8.5 | -------- | -------- | 136 | -------- | -------- | 103 |
| 0.2 | 8.8 | -------- | -------- | 123 | 20 | -------- | 109 |
| 0.25 | 8.9 | -------- | 8.7 | 111 | 19 | 13.5 | 83 |
| 0.4 | 9.2 | 230 | 9.3 | 129 | 20 | 15.1 | 114 |
| 0.8 | 9.5 | -------- | -------- | 114 | -------- | -------- | 112 |
| 1.6 | 9.8 | 200 | 10.7 | 125 | 22 | 11.4 | 118 |
| 2.1 | 9.9 | -------- | -------- | 111 | 23 | -------- | 103 |
| 2.7 | 10.1 | 170 | -------- | 87 | -------- | -------- | 82 |
| 3.0 | 10.2 | -------- | -------- | 103 | 21 | -------- | 77 |
| 3.0 | 10.2 | -------- | 10.3 | 115 | -------- | 9.3 | 77 |
| 3.4 | 10.3 | 148 | 11.3 | 105 | 19 | 8.9 | 82 |
| 4.0 | 10.5 | 163 | 11.3 | 103 | -------- | 12.0 | 88 |
| 4.0 | 10.5 | -------- | -------- | 107 | 20 | -------- | 107 |
| 5.0 | 10.8 | 135 | 12.0 | 76 | 24 | 13.5 | 108 |
| 5.2 | 11.0 | 125 | -------- | 81 | -------- | -------- | 103 |
| 6.7 | 11.3 | 110 | 11.9 | 56 | 26 | 10.6 | 98 |

100% water repellency in 2.5 hours at 120°. QUSO B with 10% of L-31 silicone mixed with 2.5% Nuocure 28 lead octoate reached 100% water repellency after 23 hours at 120°. In another comparison the QUSO B at pH 5 with 10% of L-31 silicone mixed with 2.5% of Nuocure 28 lead octoate added in a masterbatch had 100% water repellency after 144 hours at 25° C. Under the same conditions QUSO A at a pH of 8.5 reached 100% water repellency in 72 hours. QUSO B and QUSO A with 20% of a coating of a mixture of one-third GE SC 3933 silane and two-thirds Drifilm 1040 siloxane reached 100% water repellency in 2 hours at 150° C. QUSO C and B reduced to a pH of 1.8 with the same coating required only 1 hour at 150° C.

Example 8

This product was prepared from a micro fine precipitated silica prepared as in Example 1 having approximately the following properties:

| | |
|---|---|
| Ultimate particle size, m$\mu$ | 13 |
| pH | 8.5 |
| Surface area, m.$^2$/g. | 260 |
| Bulk density, lbs./cu. ft. | 2.5–5 |
| Oil absorption, lbs./lb. | 2.5 |
| Refractive index | 1.45 |
| Specific gravity | 2.1 |
| Loss on ignition, percent | 11 |
| Loss at 105° C., percent | 6 |
| Silica (anhydrous), percent | 98 |
| Silica as received, percent | 85 |

10 parts of a dimethyl polysiloxane, designated as L-45 silicone, was blended with 100 parts of the above silica. The blend was then heated to about 316° C. and cured at that temperature for about 20 hours in a gas-fired furnace. The dimethyl polysiloxane had the following generalized formula:

$$(CH_3)_3Si-O-[(CH_3)_2Si-O-]_nSi(CH_3)_3$$

The final coated product had the following approximate properties:

| | |
|---|---|
| Ultimate particle size, m$\mu$ | 15 |
| Surface area, m.$^2$/g. | 150 |
| Ignited loss, percent | 6 |
| pH | 8 |
| Viscosity test, cps. at 25° C. (in Seal Oil) | 160 |
| Bulk density, lbs./cu. ft. | 7 |
| $SiO_2$, percent | 85 |
| Water repellency, percent | 100 |

Water repellency was 100% and the clear water column height was 120–148 ml. The powder retained 29–54% of water. On extraction with acetone, either hot or cold, no siloxane was removed, and the hydrophobic properties increased on longer curing.

These coated silicas were readily dispersed at 10% loading in naphthenic and paraffinic oils. Saybolt viscosity was 80 seconds for the former and 90 seconds for the latter. When 10 parts of the coated silica was mixed with 85 parts of the oil and homogenized with a Manton-Gaulin homogenizer at 3000 p.s.i., a dispersion was formed which was stable for at least 3 months. The stormer viscosity in the naphthenic oil was 40 seconds and 100 seconds in the paraffinic oil.

In a similar system, 10% of L-45 silicone appeared to be the optimum coating level as shown herebelow:

| L-45 (percent): | Viscosity test, cps. |
|---|---|
| 0 | 300,000 |
| 6 | 3,200 |
| 8 | 960 |
| 10 | 200 |
| 15 | 200 |

Example 9

This product was prepared from a spray dried micro fine, hydrated, precipitated silica with a high pH. It had approximately the following properties:

| | |
|---|---|
| Ultimate particle size, m$\mu$ | 18 |
| Alkali ($Na_2O$), percent | 4.4 |
| Surface area, m.$^2$/g. | 148 |
| Ignited loss, percent | 7.8 |
| Wet sieve residue, percent | 0.1 |
| Loss at 105° C., percent | 3.1 |

This micro fine silica was blended with 15% of silicone L-45 in a high intensity blender for about 2 minutes. The blended product was then cured for 16 hours at 317° C. in a direct gas-fired furnace. The cured product was 100% water repellent and had an ignition loss of 3.7% and a loss at 105° C. of 1.4%. Its pH (determined in 50% aqueous alcohol) was 11.0, the bulk density was 3.9, the area about 125 m.$^2$/g. and the viscosity in Gulf #560 Seal Oil was about 100 cp.

Example 10

In this example we show that a wide range of finely divided silicas having the requisite particle size and surface area and purity may form a preferred defoamer base if they are alkalized to a pH above about 10 and preferably above about 10.5. The silicas are described in the table preceding the examples and were raised to the pH shown in the following table by the procedure of Example 6. They were cured for from 17 to 20 hours at 600° F. using L-45 di-methylpolysiloxane and the effectiveness of all of these silicas when used in the standard defoamer formulation falls on a smooth curve when plotted against the pH of the alkalized base silica before coating. In this curve the first maximum appears at about a pH of 9; the minimum at a pH of approximately 10.2, and the actual maximum at a pH of about 11. The pH was determined with KCL added to the aqueous dispersion described. All of the pigments below are precipitated hydrated silica except Cab-O-Sil M5. The viscosity in mineral seal oil below 500 cp. is a necessary but not sufficient limit for precipitated hydrated silica, but this viscosity may be much higher for a structured silica having a low ignited loss.

| | Properties of base silica | | | | |
|---|---|---|---|---|---|
| Pigment silica | pH (KCL) | Area, m.$^2$/g. | Ultimate particle diameter m$\mu$ | Viscosity in mineral seal oil, cp. | Effectiveness, percent |
| Hi-Sil 404 | 9.4 | 33 | 44 | 250 | 105 |
| QUSO: | | | | | |
| D | 9.5 | 176 | 15 | 132 | 100 |
| A | 9.8 | 132 | 16 | 138 | 95 |
| Hi-Sil 233 | 10.0 | 114 | 21 | 48 | 90 |
| Do | 10.4 | 106 | 21 | 40 | 85 |
| Zeosyl 100 | 10.7 | 67 | 24 | 100 | 115 |
| Cab-O-Sil M5 | 11.1 | 76 | 19 | 2,340 | 115 |
| QUSO D | 11.6 | 38 | 30 | 152 | 50 |

UTILITY

Our hydrophobic silicas may be used for a variety of purposes other than as defoamers. For instance, these products are useful as a carrier in the formation of aerosols for lacrimators, as described above. These finely divided hydrophobic silica particles though wet by the lacrimators are readily suspended in the air as aerosols and are therefore useful in the preparation of tear gas bombs, etc.

Micro fine silicas are very useful in improving the flow of materials. It is widely believed that this improvement is caused by the small silica particles acting as physical spacers between the larger particles of conditioned material. Poor flow may be caused by particle shape, particle irregularities, particle size, wide particle size distribution, and surface charges. The addition of small amounts of micro fine silica, usually less than the amount needed for complete surface coverage, can overcome poor flow caused by these properties. It is also known that materials containing large amounts of particle less than about 200 mesh, that is about 75 microns, are more difficult to condition to flow properly. Usually little or no improvement in flow results when hydrophilic micro fine silicas are added to such compositions.

We have found that small additions of hydrophobic silicas, such as our product of Example 8 will convert such fine, low density powders into free-flowing materials. We believe that poor flow in these powders is caused more by electrostatic charges on particles rather than shape or particle size distribution although hydrophobic silica also improves poor flow caused by these latter properties as well. It is sometimes better to retain some hydrophilic character by controlling the amount of coating and the curing conditions.

It is important to properly incorporate any conditioning agent into the material. Enough mixing is needed to disperse the conditioning agent evenly throughout the powder. Excessive mixing should be avoided since it increases charges and can alter the size and shape of the material.

In an example, 40 grams of chopped glass fibers about 1/32" long were tumbled with 0.5% of product of Example 8 for 20 minutes. The angle of repose was 27° and the flow was excellent. Untreated material had an angle of repose of 48° and would not flow through the funnel without tapping.

When an oxidizable pigment is mixed with a micro fine silica coated with a hydrophobic agent as, for instance, a silicone, the pigment may be heated at high temperatures for considerable time without losing color or otherwise breaking down. More specifically, inorganic pigments as, for instance, metallic sulfides which will oxidize to uncolored sulfates at temperatures as low as about 400° C. may be heated for several hours at temperatures of 600° C., or higher, without changing color, when combined with finely divided silica made hydrophobic by heat treatment with a silicone such as a siloxane.

A blend of cadmium sulfide and about 1% of our product of Example 8, for instance, may be kept at about 105° C. in a humid atmosphere without color change, whereas if a hydrophilic silica (that is the same silica without the siloxane coating) is blended with the cadmium sulfide, the color of the cadmium sulfide will change.

When heating at 600° C., cadmium sulfide without any added silica will become a multicolored mass of red, yellow, black and white. If a hydrophilic or uncoated silica is blended with the cadmium sulfide and the mixture heated at 600° for 2 hours, the cadmium sulfide turns white. This appears to be caused by the oxidation of the sulfide on the sulfate. In this case 1% of the silica was used.

If, however, 1% of our hydrophobic silica products of Example 8, for instance, is blended with the cadmium sulfide, and held at 600° for 6 hours, the lemon color is still maintained and the product is still somewhat hydrophobic. We assume that the hydrophobic silica helps to prevent close contact of water and/or oxygen with the surface of the cadmium sulfide or else the organic coating is sacrificed by reaction with oxygen.

These coated silicas are also useful as anti-caking agents. Ammonium nitrate will cake in 1 day at 81% relative humidity. With the addition of QUSO B the caking was prevented for 3 days with a 1% loading and 6 days with a 3% loading. On the other hand, with our product of Example 8 caking was totally prevented for over 1 week at the 1% loading. Caking caused by moisture gain may be minimized by addition of hydrophobic silicas. The addition of only 1% of our product of Example 8 to ammonum nitrate and sodium hexametaphosphate permitted these water soluble materials to float on water.

These products are representative of the hydrophobic products which may be prepared with these catalytic agents and high pH. Generally it is more difficult to obtain adequate hydrophobicity at intermediate pH's of about 5 to 8 and longer times are required when the base silica has a pH in such a range. It is also evident that it is much easier to cure the methyl hydrogen silcone oil than the dimethyl silicone oils and that the metal soap catalysts are generally more satisfactory than the peroxide catalysts.

More or less detailed claims will be presented hereinafter and even though such claims are rather specific in nature those skilled in the art to which this invention pertains will recognize that there are obvious equivalents for the specific materials recited therein. Some of these obvious equivalents are disclosed herein, other obvious equivalents will immediately occur to one skilled in the art, and still other obvious equivalents could be readily ascertained upon rather simple, routine, noninventive experimentation. Certainly no invention would be involved in substituting one or more of such obvious equivalents for the materials specifically recited in the claims. It is intended that all such obvious equivalents be encompassed within the scope of this invention and patent grant in accordance with the well known doctrine of equivalents, as well as changed proportions of the ingredients which do not render the composition unsuitable for the disclosed purposes. Therefore, this application for Letters Patent is intended to cover all such modifications, changes and substitutions as would reasonably fall within the scope of the appended claims.

What we claim is:

1. In the known process for forming an alkaline base silica which comprises
  (a) forming a protocoacervate from a soluble silicate solution using a coacervating agent,
  (b) adding an insolubilizing agent to the protocacervate to cause precipitation of the hydrate, said insolubilizing agent consisting of an acidic material having an anion of an acid stronger than silicic acid and capable of precipitating substantially gel-free silica,
  (c) maintaining the environmental conditions substantially uniform in the above mixture while the finely divided silica products are in formation by mixing said coacervating agent with said sodium silicate solution not later than said insolubilizing agent is mixed therewith and completing the mixing in of the insolubilizing agent before the appearance of any substantial amount of silica precipitate, and in any event within a period not substantially exceeding 5 seconds, the improvement which comprises following completion of the mixing in of the insolubilizing agent and the appearance of the silica precipitate, adding thereto a soluble alkali in an amount of from about 2.5 to 8% $Na_2O$ based on the weight of silica so as to thereby raise the pH of the so-formed slurry to a pH within the range of 10 to 12, and recovering the finely divided silica thereby produced.

2. The process of claim 1 in which the coacervating agent is selected from the group consisting of highly soluble inorganic salts, water-miscible hydrogen bonding agents and highly soluble nitrogen bases.

3. A hydrophilic silica produced according to claim 1 having between about 2.0% and 8% $Na_2O$, a particle size of 15 to 50 m$\mu$, an area of 50 to 175 m.$^2$/g., and capable of forming a defoamer having greater than 100% efficiency when made hydrophobic.

References Cited

UNITED STATES PATENTS

| | | | |
|---|---|---|---|
| 3,208,823 | 9/1965 | Baker et al. | 23—182 |
| 3,342,748 | 9/1967 | Marotta | 252—313 S |

JOHN D. WELSH, Primary Examiner

U.S. Cl. X.R.

23—182; 252—449, 1